United States Patent
Shuman et al.

(10) Patent No.: US 8,176,027 B1
(45) Date of Patent: May 8, 2012

(54) SPATIAL INDEX FOR DATA FILES

(75) Inventors: Michael V. Shuman, Chicago, IL (US);
Kurt Brooks Uhlir, Chicago, IL (US)

(73) Assignee: NAVTEQ B.V., Veldhoven (NL)

( * ) Notice: Subject to any disclaimer, the term of this patent is extended or adjusted under 35 U.S.C. 154(b) by 1243 days.

(21) Appl. No.: 11/175,665

(22) Filed: Jul. 6, 2005

(51) Int. Cl.
*G06F 7/00* (2006.01)

(52) U.S. Cl. .................................................. 707/706

(58) Field of Classification Search .................. 701/209; 707/712, 706
See application file for complete search history.

(56) References Cited

U.S. PATENT DOCUMENTS

| | | | |
|---|---|---|---|
| 6,061,688 A | 5/2000 | Kilpatrick et al. | 707/102 |
| 6,801,851 B2* | 10/2004 | Kawakami | 701/209 |
| 6,834,276 B1* | 12/2004 | Jensen et al. | 707/2 |
| 2002/0145620 A1* | 10/2002 | Smith et al. | 345/712 |
| 2004/0114042 A1* | 6/2004 | Paolini et al. | 348/207.99 |
| 2005/0060299 A1* | 3/2005 | Filley et al. | 707/3 |
| 2005/0102368 A1* | 5/2005 | Forman et al. | 709/207 |
| 2005/0119036 A1* | 6/2005 | Albanna et al. | 463/7 |
| 2005/0149258 A1 | 7/2005 | Gargi | 701/208 |
| 2005/0207672 A1* | 9/2005 | Bernardo et al. | 382/284 |

* cited by examiner

*Primary Examiner* — Truong Vo
(74) *Attorney, Agent, or Firm* — Frank J. Kozak; Jon D. Shutter; Adil M. Musabji

(57) ABSTRACT

A method and system of managing computer data files are disclosed. Each computer data file on at least one data storage device is associated with at least one physical geographic location. Alternatively, the location may be an actual physical geographic location, a virtual location, a historical location, a fictional location, and so on. A function provides for searching and accessing the computer data files by location.

21 Claims, 7 Drawing Sheets

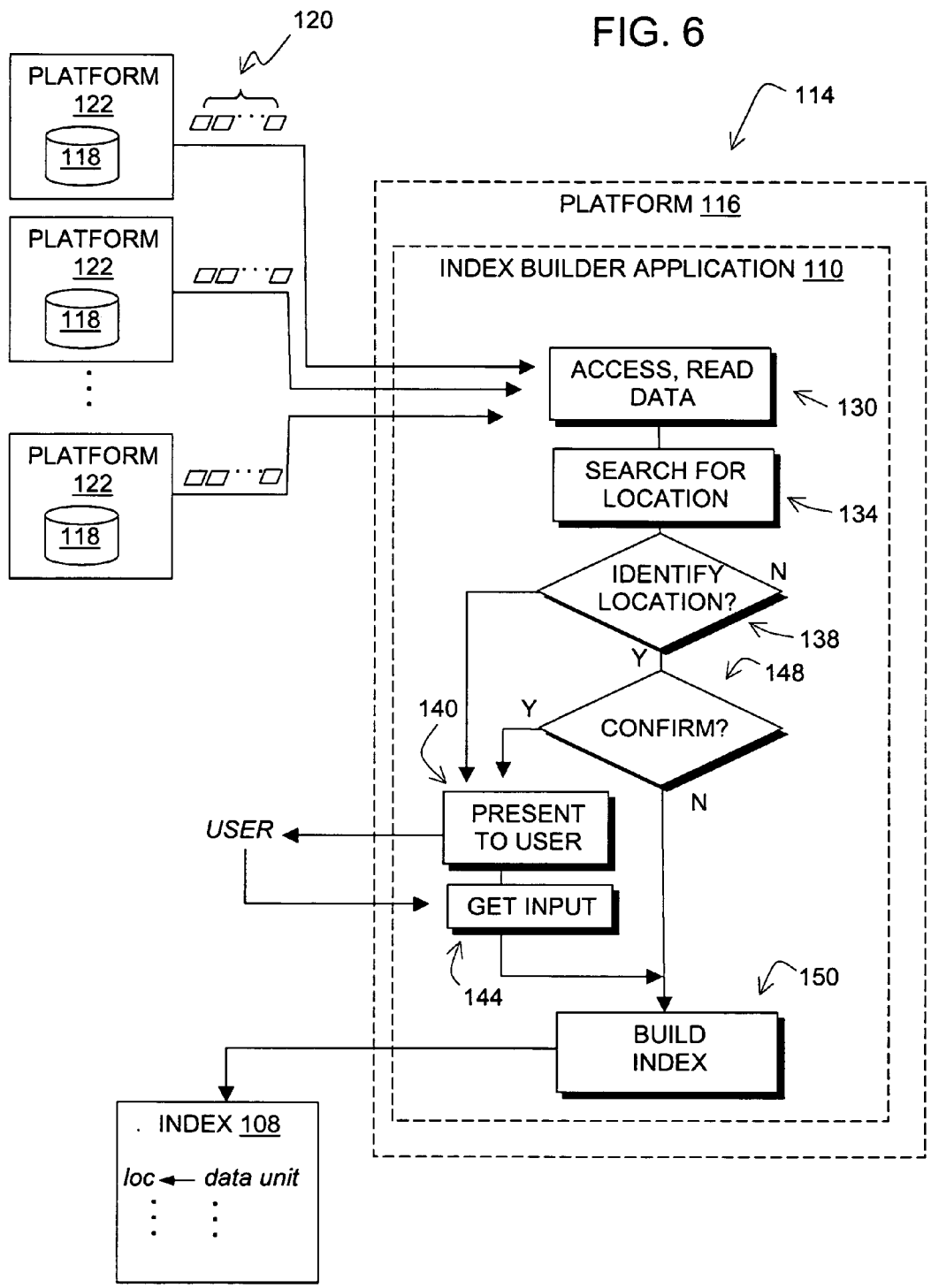

FIG. 7

```
┌─────────────────────────────────────────────────────────────┐
│                      INDEX 108                              │
│                                                             │
│  LOC1  ◄──── C:\MYDOC~12\MYPICS~55\image_25.jpg             │
│              C:\MYDOC~12\MYPICS~55\image_39.jpg             │
│              C:\MYDOC~12\MYPICS~55\all_pts.gif              │
│              C:\MYDOC~12\user1\agenda(5june).doc            │
│              C:\MYDOC~12\user1\client_proj.xls              │
│              C:\MYDOC~12\user1\agenda(5june).doc            │
│              C:\ProgramFiles~3559\Office\Outlook\1938jr.eml │
│              C:\CELLX~56\raef\start39\moredocs\pres\introAp.ppt │
│                                                             │
│  LOC2  ◄──── C:\MYDOC~12\MYPICS~55\image_4679.jpg           │
│              C:\MYDOC~12\MYPICS~55\more\image_85.jpg        │
│              R:\groupste~4\rol0078pri\metr\all_docs\glow.ppt│
│              R:\groupste~4\rol0078pri\metr\private\ \onet34.doc │
│              C:\ProgramFiles~3559\Office\Outlook\276499rls.eml │
│                                                             │
│  LOC3  ◄──── device2386(camera):\image_1230.jpg             │
│              device2386(camera):\image_1231.jpg             │
│              device2386(camera):\image_1234.jpg             │
│              device2386(camera):\image_2780.jpg             │
│              device0081Q6(PDA):\calendar\entry2398.txt      │
│              media0997342(CD-ROM):\tracks\m0101184.wav      │
│                                                             │
│              ⋮              ⋮                                │
│                                                             │
└─────────────────────────────────────────────────────────────┘
```

SPATIAL INDEX FOR DATA FILES

BACKGROUND OF THE INVENTION

The present invention relates to a feature for a computer data file system that enables a user to store, retrieve and use computer data files, or other items of data, based on physical geographic locations.

Conventional computer file systems arrange data files or other data items with indexes created by the location of the file in a file structure hierarchy (e.g., Disk0, Directory \A\B\C) or the type of file, e.g., Notes, Calendar, etc. While these types of file systems are useful, there are considerations to be addressed. For example, conventional data file management systems sometimes require a significant amount of time to plan and maintain. Moreover, as users accumulate large numbers of files, conventional data file management systems may not adequately serve the needs of the users who created the files. This may result in users being unable to find needed files or spending significant amounts of time finding needed files.

Accordingly, there exists room for improvements in the way computer data files are managed and organized.

SUMMARY OF THE INVENTION

To address these and other objectives, the present invention includes a method and system of managing computer data files. Each computer data file on at least one data storage device is associated with at least one physical geographic location. A function provides for searching and accessing the computer data files by physical geographic location.

According to another aspect, a method and system for managing computer data files associates each computer data file stored on a data storage device with at least one location, which may be an actual physical geographic location, a historical location, a fictional location, a virtual location, or the like.

BRIEF DESCRIPTION OF THE DRAWINGS

FIG. 6 shows steps performed by the index builder application of FIG. 5.

FIG. 7 is a block diagram that shows components of the spatial index for computer data files in FIG. 6.

DETAILED DESCRIPTION OF THE PRESENTLY PREFERRED EMBODIMENTS

I. Definitions

For purposes of this disclosure, a "data unit" refers to any discretely addressable or retrievable item of data, including a data file, such as a text file, a Word document, an HTML page, an XML file, an image (*.tif, *.gif, *.jpg, etc.), an email, a calendar or database entry, an audio file (*.mp3, *.wav), a video file, and so on. A data unit is not limited to any particular computer platform, operating system, or application.

For purposes of this disclosure, a "person" refers to any individual human, an entity, such as a corporation or partnership, a group of more than one individual or entity or combinations thereof.

II. First Embodiment

A. Associating Data with Locations

A first embodiment is directed to a computer data file management feature that can be used by a person to organize and manage data units stored, owned, controlled and/or used by the person. The data units are stored on one or more computer storage devices (e.g., hard drives, magnetic and/or optical media, RAM, etc.) associated with one or more computing platforms. The computing platforms may include the person's personal computer(s), PDA(s), mobile phone(s), optical and magnetic storage (e.g., removable disks, CD-ROMs, DVDs, hard drives, flash memories), music players, and network storage.

Figure 1:
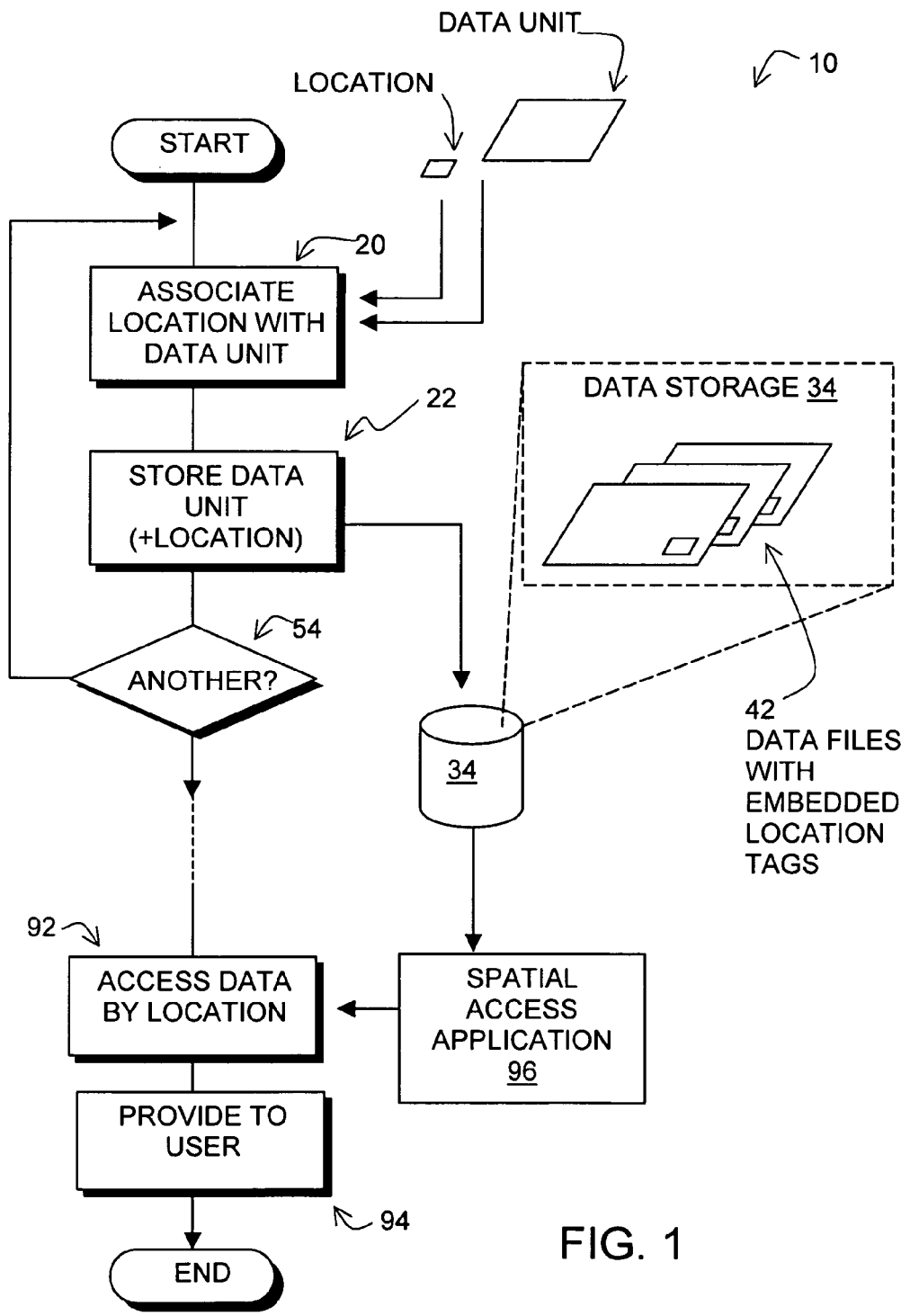
FIG. 1 is a flowchart showing steps in an overall process of a first embodiment of a spatially-based data file management system.
Figure 2:
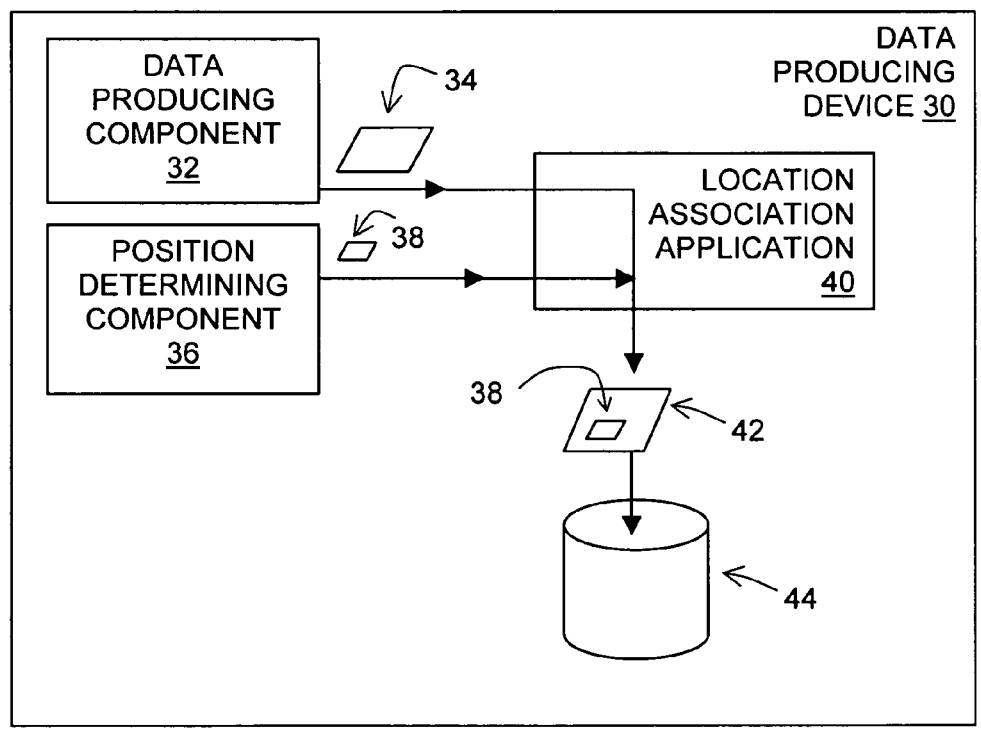
FIG. 2 is a block diagram showing a system for performing one of the steps of FIG. 1.
Figure 3:
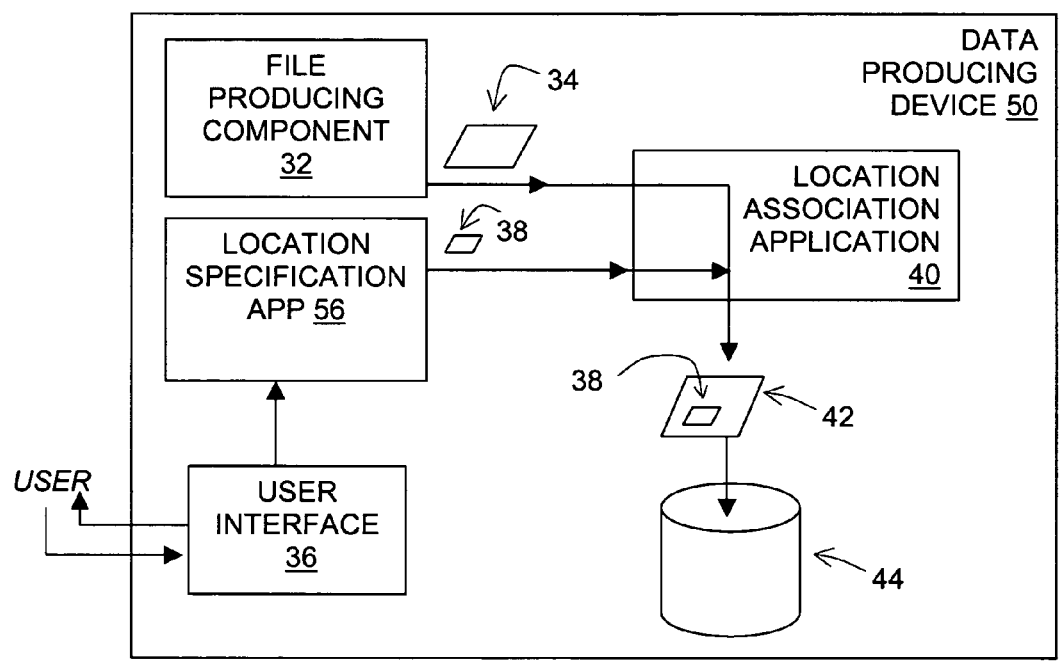
FIG. 3 is a block diagram showing another system for performing one of the steps of FIG. 1.
Figure 4:
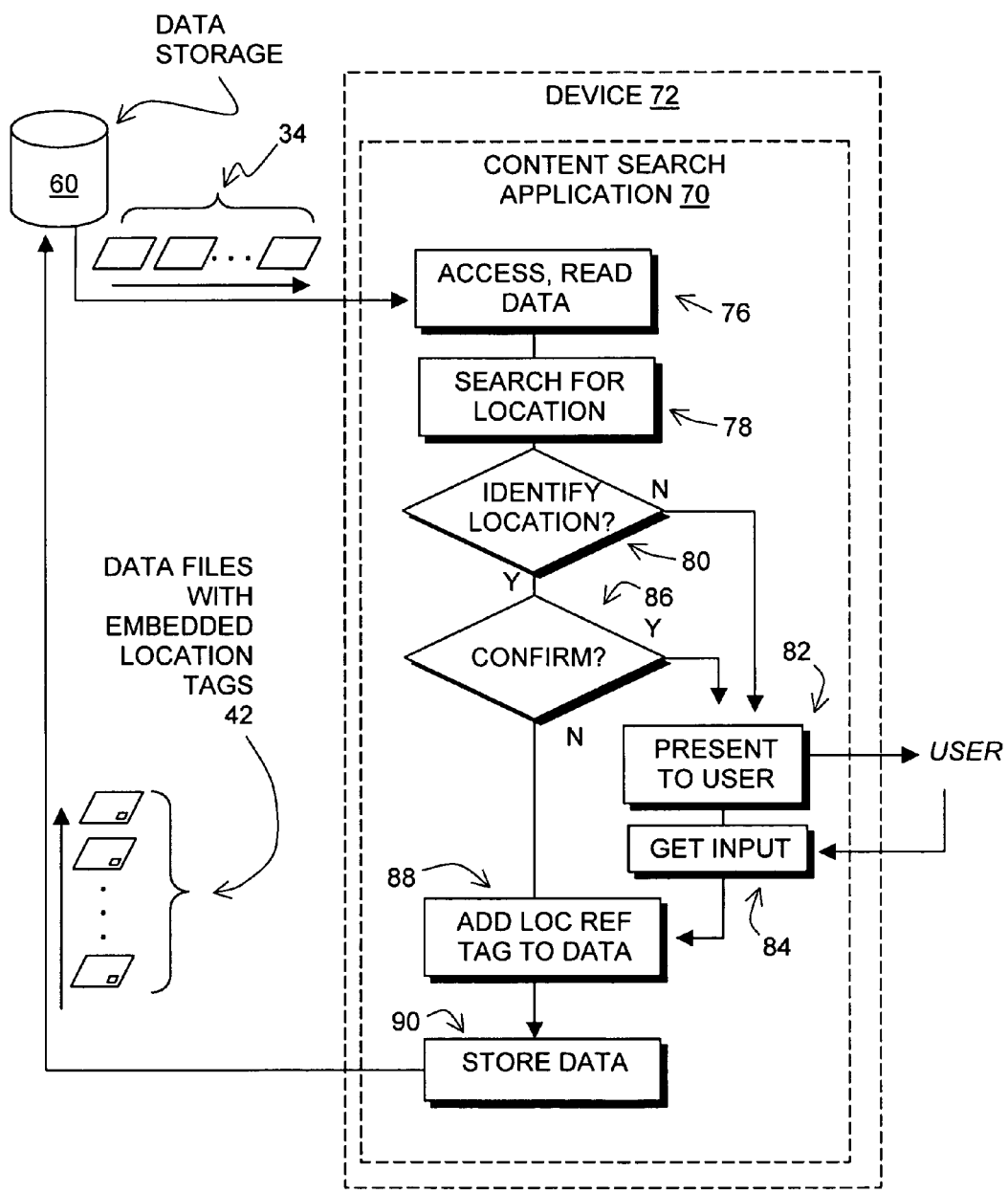
FIG. 4 is a block diagram showing still another system for performing one of the steps of FIG. 1.

FIG. 1 is a flowchart showing an overall process 10 of the first embodiment. In the process 10, a data unit is associated with a location (Step 20) and stored (Step 22). FIGS. 2-4 show several ways for performing these steps. The alternatives shown in FIGS. 2-4 represent only some of the possible ways for performing the steps of associating a data unit with a location and storing the data unit. Those of skill in the art may know or develop additional ways to perform these steps and such additional ways are considered to be included within the scope of this invention.

1. Use of Positioning System

FIG. 2 shows a data-producing device 30. The data-producing device 30 includes a data producing component 32. The data producing component 32 is a combination of hardware and software capable of accessing, creating, modifying and/or storing a data unit on a data storage medium. Examples of data producing components include personal computers, digital cameras, PDAs, mobile phones with data storage features, digital video players or recorders, digital music players, etc, or other items of equipment that incorporate similar technologies. The data-producing component uses any current or future technology for acquiring and saving data units (e.g., data files, emails, digital photos, audio files, video files, etc.) on a media. The media on which the data units are stored may include hard disks, flash cards, memories, and so forth. The data producing component 32 is operable by a person and may include a suitable user interface.

The data-producing device 30 includes a component 36 that determines the position of the data-producing device 30. In one embodiment, the position-determining component 36 is a GPS unit. Alternatively, the position-determining component 36 is implemented using other technology. Such other technologies may include DGPS, LORAN, inertial sensors, RFIDs, signal reception technology (i.e., whereby the location of a device such as a mobile phone can be determined remotely using signal triangulation, signal time-of-arrival, direction-of-arrival, etc.) and so on. In yet another alternative, the position-determining component is an external unit to which the data producing component 32 is temporarily or permanently connected, such as a PDA with an attachable GPS unit. Alternatively, the position-determining component 36 may include a user interface through which an operator of the data producing component 32 may specify or input a location. Combinations of different technologies may also be used. The position-determining component 36 may use (or rely on) equipment or components located outside the data-producing device 30. For example, in the case of a GPS unit, the position-determining component 36 relies on signals from GPS satellites.

When the data-producing device 30 is operated to create or modify a data unit 34, data 38 indicating the location of the data producing device 30 is obtained from the position determining component 36. In the data producing device 30, the data 38 indicating the location of the data producing device 30 is obtained at the same time that the data is created or modified. The data 38 indicating the position of the data-producing device 30 is associated with the data unit 34 being created or modified. A suitable application 40 is used for this purpose. In one present embodiment, the location association application 40 embeds the data 38 indicating the location of the data producing device 30 in a copy of the data unit 34 created or modified by the data producing device 30 to form a new, location-enhanced data unit 42 that includes the data 38 indicating the location of the data producing device 30. The data unit 42, as modified by the location association application 40, contains all the information contents as the original data unit 34 produced by the file producing component 32 and, in addition, includes the data 38 indicating the location of the data-producing device 30. The data unit 42 can be used in the same ways as the original data unit 34. The data 38 indicating the location of the data producing device 30 may occupy a portion of the header or tag of the data unit 42 or may otherwise be stored or embedded as part of the metadata of the data unit 42. The data unit 42 is stored on a suitable storage medium 44 in the data-producing device 30. Alternatively, the data indicating the position of the data-producing device 30 may be stored in another data file and/or on a separate medium.

The data-producing device 30 may also acquire and store additional information in the data unit 42, such as the date and/or time that the data unit was created or modified.

2. User input

FIG. 3 shows another way for performing the step (20 in FIG. 1) of associating a location with a data unit. FIG. 3 shows a data-producing device 50. The data-producing device 50 may be similar in some respects to the data-producing device 30 of FIG. 2, and like components are indicated by the same numerals. The data-producing device 50 in FIG. 3 includes a data-producing component 32. The data producing component 32 may be implemented by any of the means described in connection with the data producing component 32 of FIG. 2, including personal computers, digital cameras, PDAs, mobile phones with data storage features, digital video recorders, digital music players, etc.

Unlike the data-producing device 30 of FIG. 2, the data-producing device 50 of FIG. 3 does not necessarily include a position-determining component. Instead, the data-producing device 50 includes a location specification application 56. The location specification application 56 is a software application. The location specification application 56 may be located on the same hardware platform that includes the data producing device 50 or may be located on another computer platform. The location specification application 56 can be accessed by the user of the data-producing device 50. The location specification application 56 accepts a specification by the user of a location to be associated with a data unit produced or modified by the file producing component 32. The location specification application 56 may allow the user to specify the location by various different means, such as by street address, geographic coordinates, place name, and so on. The location specification application 56 may also allow the user to specify the location by indicating the location on a map.

Once the user operates the location specification application 56 to indicate the location to be associated with a data unit 34, the location association application 40 modifies the data unit 34 by adding the data 38 indicating the specified location thereby forming a location-enhanced data unit 42. The location association application 40 then stores the data unit 42 on a data storage device 44 associated with the data producing device 50. The data unit 42 is a copy of the data unit 34 produced by the data producing component 32 to which is added the data 38 indicating the physical geographic location that had been specified by the user via the location specification application 56. The data 38 indicating a physical position may be stored in a header, tag, metadata, etc., embedded or associated with the data unit 42.

3. Use of Content Search Application

FIG. 4 shows another way for performing the step (20 in FIG. 1) of associating a location with a data unit. In FIG. 4, one or more data units 34 are stored on a data storage device 60. A content search application 70 is run on a computing device 72 that has access to the data storage device 60. The content search application 70 is a software application capable of accessing the data units 34 (Step 76) and searching the information contents of the data units 34 for references to physical locations (Step 78). For example, the content search application 70 is capable of searching the contents (including embedded tags) of saved web pages, emails, word processing documents, presentations, spreadsheets, databases, audio files, images, etc. The content search application 70 searches the contents of these data units for references to street addresses, geographic coordinates, places, municipalities, countries, states, assigned location reference numbers, or other types of references to physical geographic locations. (The content search application 70 may also identify locations from non-text content in the file, e.g., through the use of image recognition technology locations can be identified by comparing pictures to an image database.)

In a present embodiment, the content search application 70 may include a user interface that presents a user with a means by which the user can specify a location for a data unit if a search of the contents of the data unit does not reveal a specific reference to a geographic location (Steps 80, 82, and 84). The user interface may also be used to obtain confirmation from the user that a location reference found in the contents of a data unit should be used as the location reference associated with the data unit (Steps 86, 82, and 84).

When the content search application 70 identifies and/or confirms a location reference for a data unit 34, it modifies the original data unit 34 to form a new data unit 42 that includes a specific location reference tag embedded therein (Step 88). The specific location reference included in the new data unit 42 by the content search application is included in a portion of the data unit, such as a header or in other metadata, where it can readily be identified. The modified data unit 42 is then stored back on the data storage device 60 (Step 90). The modified data unit 42 can be used in all the same ways as the original data unit 34.

Content Search Application Operation Modes

The content search application 70 may operate in batch mode (wherein multiple data files are searched before the results are presented to the user) or interactive mode (where a single data unit is searched at a time). The content search application may be operated as a background application.

Multiple Locations

A single data unit may be associated with multiple locations. In a present embodiment, the content search application may find multiple location references in the contents of a single data unit.

Content Search Application Rules.

In a present embodiment, the content search application 70 may include one or more sets of user-defined rules. The user-defined rules assign specific locations to certain data files based on certain conditions defined by the rules. For example, a user-defined rule may specify that all word processing documents created by a user on his/her home computer are to be associated with the location of the user's home. A user-defined rule may also specify whether a condition in the rule is to take precedence over a location reference found in the contents of a data unit, or vice versa. The user-defined rules may specify that multiple location references may be associated with a single data unit.

The user may also create rules for associating certain phrases or even slang with a location. In a further alternative, multiple strings of locations, references, or descriptions may be used to create a more specific or more abstract location reference for a file than any specific location reference by itself.

4. Alternative Ways to Associate Data with Locations

The ways of associating a data unit with a location described in connection with FIGS. 2-4 may be combined.

As stated above, the alternatives shown in FIGS. 2-4 represent only some of the ways for performing the step of associating a data unit with a location. Additional ways to perform this step may be developed and used.

5. Alternative Ways to Express Locations

There are different ways that the locations to which the data units are associated can be expressed. Some of these ways include geographic coordinates (latitude, longitude, and possibly altitude), street addresses, location reference codes, place names, points-of-interest names, building names, intersections, and so on. Altitude information may be included and expressed as a Z-level, Y-axis location, building floor, overpass, tunnel, bridge, etc. Locations may also be expressed as references to map data. For example, a location may be expressed by referring to a NAVTEQ Link ID. Data units may also be associated with areas, such as municipalities, countries, states, counties, neighborhoods, etc. In some cases, the way that the location is expressed depends on the positioning equipment used to obtain the location. For example, a GPS unit used to obtain a location associated with a data file (e.g., an image) may express the location using latitude and longitude. In another alternative, locations may be expressed with sub-meter resolution, e.g., to objects within a building or room, such as a kitchen cabinet, a monitor on a desk, a driveway, etc.

Locations associated with data units may be converted from one form of expression to another. For example, a location expressed as a street address may be converted to geographic coordinates, and vice versa.

B. Accessing Data by Location

Referring again to FIG. 1, after the data units on the data storage device(s) have been associated with locations and stored, the user can access, retrieve, view, browse, obtain a list of, or sort the data files 42 on the data storage device 34 by location (Steps 92 and 94). A spatial access application 96 may be used for this purpose. The spatial access application 96 is a software application that the user can access and run from a suitable computer platform. For example, the spatial access application 96 may be executed and run from a user's personal computer or PDA. Alternatively, the spatial access application 96 may be run over a network and accessed from any computing device including a user's mobile phone.

The spatial access application 96 includes a user interface that provides a user various ways to specify locations, e.g., by street address, geographic coordinates, place names, intersections, position on a map, etc. When the user has indicated a location to the spatial access application, the spatial access application identifies the data units associated with the location specified by the user and returns the data units, or a list of the identified data units, to the user. In one embodiment, the spatial access application 96 searches the embedded location tags included in each data unit 42 to find data files that have embedded location tags that match the user's location specification and returns the identified data units to the user.

The spatial access application 96 may present the data units that match the user's location specification in various ways. The identified data units may be presented as a list for browsing, e.g., in a standard textual file structure format that textually represents geographic locations. Alternatively, the identified data units may be represented in a geographic format, e.g., on a map. According to this alternative, the identified data units are represented by icons positioned on a map that shows the location specified by the user. The icons are positioned at locations that correspond to the location associated with each data unit.

Operation of the spatial access application 96 can be set to return only exact matches, i.e., data units associated with the exact location specified by the user. Alternatively, operation of the spatial access application 96 can be set to return proximity matches, i.e., data units associated with locations physically close to the location specified by the user as well as data units associated with the exact location specified by the user. The threshold distance for proximity matches may be specified by the user. When returning data units within a proximity threshold, the spatial access application may sort the data units in order by distance from the location specified by the user.

The embodiment shown in FIG. 1 enables a user to manage and use data files in new and useful ways. For example, the spatial access application in FIG. 1 allows a user to view all data files relating to a customer site, all tasks (saved as data items in a task list) relating to his/her living room or back yard, all shopping lists related to a mall, or all shopping lists that are geo-indexed to stores that have locations nearby.

Using the embodiment of FIG. 1, data units may be browsed spatially, e.g., "what items are related to customer site X" or "what files are near me now." A browser may be opened that enables a user to virtually move toward geographic locations browsing the data items that relate to locations along the way. Alternatively, physically moving along a route through a geographic region with a positioning system operatively connected to a file browser allows data items associated to locations in proximity to the route to be identified and opened.

The following are examples illustrating uses of the spatial access application.

Example 1

Data copies of a user's work timesheet are associated with the location of the user's office.

Example 2

A data copy of a presentation file (*.ppt) may be associated with a sub city region where a customer's business is located.

Example 3

A data copy of an appointment reminder may be associated with a city or state, e.g., call Mr. Smith when in Chicago.

Example 4

A data copy of a shopping list with hardware items may be associated with multiple locations of a hardware store chain.

III. Second Embodiment

A. Associating Data with Locations

Figure 5:
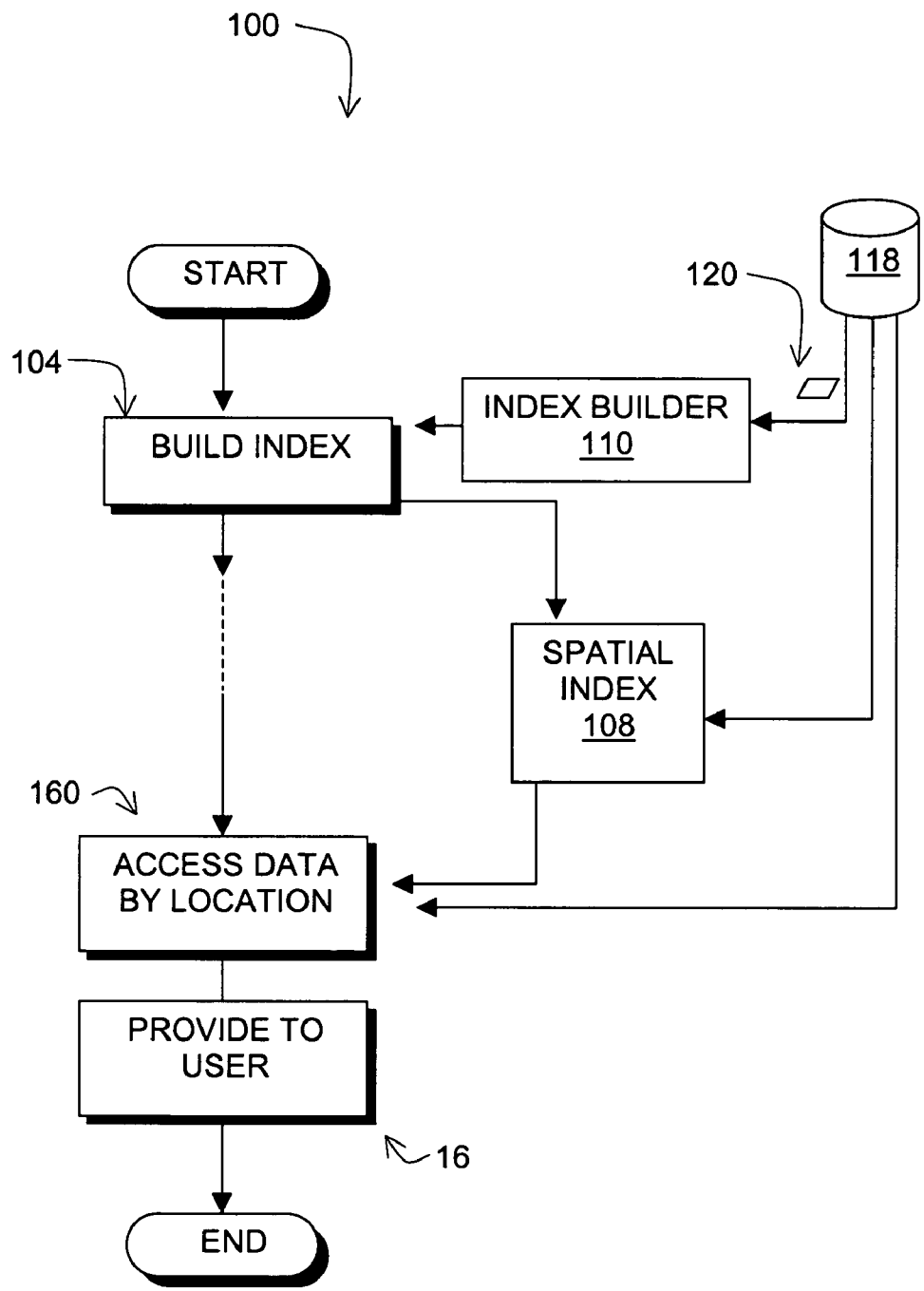
FIG. 5 is a flowchart showing steps in an overall process of another embodiment of a system for managing computer data files based on spatial information.

FIG. 5 shows a second embodiment of a process 100 for a file management feature that can be used by a person to help organize and manage data units stored and/or used by the person. The embodiment in FIG. 5 is similar to the first embodiment in that data items owned by a person are associated with locations so that the data can be accessed by location. The embodiment of FIG. 5 differs from the first embodiment in that the location data is not embedded in the data files. Instead, an index is created that performs the function of associating each data item with one or more locations.

B. Creating the Spatial Index

Referring to FIG. 5, a first step of the process calls for building a spatial index 108 of the data items controlled, owned, created, or used by a person (Step 104). An index builder application 110 may be used for this purpose.

FIG. 6 shows a process 114 performed by the index builder application 110. The index builder application 110 is run on a computer platform 116 that has access to the data storage devices 118 on which are stored data units 120 owned or controlled by a person. The data storage devices 118 include hard drives, optical and/or magnetic media, etc., associated with one or more computing platforms 122. The computing platforms 118 may include a person's personal computer(s), PDAs, mobile phone, music players, and associated network storage. Some of the data units 120 may be stored on data storage devices that are removable from a specific computing platform, e.g., CD-ROMs, DVDs, flash memories, and so on.

In a first step of the index builder process 114, some or all the data units 120 are accessed and read (Step 130). The index builder application 110 searches the contents of each data unit for a reference to a physical geographic location (Step 134). The index builder application 110 searches the contents of these data units for references to street addresses, geographic coordinates, places, municipalities, countries, states, assigned location reference numbers, or other types of references to physical geographic locations.

In a present embodiment, the index builder application 110 includes a user interface that presents a user with a means by which the user can specify a location for a data unit if a search of the contents of the data unit does not reveal a specific reference to a geographic location (Steps 138, 140, and 144). The user interface may also be used to obtain confirmation from the user that a location reference found in the contents of a data unit should be used as the location reference associated with the data unit (Steps 148, 140, and 144).

When the index builder application 110 identifies and/or confirms a location reference for a data unit 120, it adds an entry to the searchable index file 108 that associates the data unit to the location (Step 150). In this embodiment, the data unit is not necessarily modified.

The process 114 continues until all the data units that the user wishes to associate with locations are identified and associated with appropriate locations.

FIG. 7 is a diagram illustrating an example of the structure of the spatial index for data files.

C. Using the Spatial Index

Referring again to FIG. 5, after the spatial index 108 is built, it is used by a person to access data units spatially (Step 160). The spatial index 108 allows a user to find data units based on location. The spatial index 108 may be used with an application that allows a user to specify a location. When a location has been specified, the application uses the spatial index 108 to identify the data units owned or controlled by the person that are associated with the specified location. The embodiment of FIG. 5 may be used in the same ways described above in connection with the embodiment shown in FIG. 1.

IV. Alternative Embodiments

In the above embodiments, methods are described for accessing computer data files based on physical geographic locations associated with the computer data files. In some embodiments, all the computer data files owned, used, or controlled by a person are accessible based on locations associated with the computer data files. In other embodiments, only some of a person's computer data files are accessible based on locations associated with computer data files. For example, a person may choose to have only those data files that relate to business contacts accessible based on locations associated with the data files.

The disclosed embodiments for managing computer data files that enables accessing them by physical geographic location may be used in conjunction or combination with other data file management systems. Alternatively, any of the disclosed embodiments can be used without other file management systems.

In the first embodiment disclosed above, it was described that the computer data files used by a person include, or are modified to include, embedded location reference codes that associate each data file with a physical geographic location. This embodiment may also include a spatial index, similar to the index described in connection with the embodiment of FIG. 5, that associates each computer data file with a physical geographic location. Including a spatial index may improve performance when accessing computer data files by location.

Another alternative embodiment of a system for organizing computer data files by location includes a combination of the first and second embodiments. According to this alternative, some data files used by a person include, or are modified to include, an embedded location reference code that associates the data files with a physical geographic location, whereas other data files used by the person do not include an embedded location reference code. In this embodiment, a spatial index is used to access the data files used by the person that do not include an embedded location reference code. The spatial index may also be used to access the data files used by the person that include an embedded location reference code. Alternatively, the data files used by the person that include an embedded location reference code may be accessed by other means.

According to another alternative embodiment, computer data files may be referenced to historical places or events. Historical or ancient names for places may be used instead of current names for places.

As mentioned above, a computer data file may be associated with more than one location. In a further alternative, a computer data file may be associated with multiple locations hierarchically. As an example, an entire computer data file may have an overall location reference association, while specific subsections of the computer data file may have different, more specific or more abstract location references. This hierarchical location data may be associated with a computer data file using embedded metatags, an external spatial index, or a combination of different approaches. The overall location reference information for a computer data file may be obtained by weighting the location references within the file. According to this process, a weight, priority or number of location references for each location used in the index could be used to improve search functionality. This could be associated with the file saving structure that uses location. In a further alternative, some file systems allow for multiple references to a file or subsections within a file. By associating geo-indexes with subsections or child portions of a file (e.g., a particular slide in a presentation or a chapter in a book), a more efficient means of establishing or using these references can be created for extracting information or saving of information.

In one of the above embodiments, it was described that an index builder application searches the contents of existing computer data files stored on a data storage device for references to geographic locations and then builds an index associating the computer data files with the geographic locations. Alternatively, instead of searching the contents of computer data files that have already been created and stored, the index builder application may operate on computer data files as they are created to search for references to geographic locations. The index builder application would then build a geographic index in the same manner as described above.

In another alternative, computer data files may be referenced to fictional or virtual places. Such places may be entirely fictional or may be based on real places. For example, computer data files may reference "Camelot." The location associated with "Camelot" may be in the UK, in France, in the Middle East, or some place else selected by the user. A computer data file that references "Camelot" may also reference other real locations, such as where it was created, the hometown of the author, where it was presented, etc. Computer data files may be associated with virtual places from video games. Another alternative for associating computer data files with locations relates to archeological sites.

In embodiments described above, it was stated how the computer data files stored on the various devices used by a person may be associated with locations. The system and method may also be applied to distributed or grid computing systems, or split processing or split storage.

Referencing computer data files to geographic locations may be used for security purposes. As an example, computer files referenced to certain locations may be restricted to certain users or for limited functions. For example, a person may password protect all files associated with a certain customer location.

Another alternative provides for batch updating of location file references. Files meeting specified criteria may be batch updated to include a new reference (e.g., a new office branch of a customer) or updated to a current reference (e.g., where a user's home location changes when the user moves, or inventory audit updates all files referenced to items found in audit to that location).

Another alternative process provides for re-indexing orphaned computer data files due to a change or loss of a spatial data source, e.g., if an office is closed and removed from the data source, the spatial file management system would re-index those files to a new location or otherwise alert the user. In this alternative, a change in the source spatial data may provide that all indexes be verified.

In the embodiments disclosed above, different ways of expressing location were described. In a further alternative, computer data files may be associated with mobile locations. For example, computer data files may be associated with an automobile, a movable piece of furniture, etc. Files on removable media, such as CDs, CD-ROMs, DVDs, USB cards, etc., may be associated with the location(s) of one or more playback devices or other locations.

It was described above that computer files relating to a location could be browsed. In another alternative, levels of importance may be associated with files. According to this alternative, files may be browsed and retrieved using a combination of both location and importance levels as criteria. According to this embodiment, a file may be retrieved and browsed even if it is outside a search location criteria if the importance level of the file is high enough.

Vehicular or pedestrian routing algorithms may be developed to route between files, as cross referenced to their locations, rather than the locations themselves.

In an above embodiment, it was described that the location to which a file is associated may be stored as metadata in a tag embedded in the file. In an alternative, creation of this metadata tag may be performed by a third party, based on the operating system or application used to create the file.

In another alternative, it is possible to derive a location to be associated with a computer data file based on the relevance of the file to other located files. For example, if nine computer data files contain presentation material for a particular customer and eight of the computer data files are associated with a given location, then the ninth computer data file may also be associated with the location.

Another embodiment addresses the use of different sources of geographic data used for specifying geographic locations to which computer files are associated. In one embodiment, data is stored in the spatial index, spatial metatag, or elsewhere, to indicate the data source(s) used to specify the geographic locations. For example, the name of the data provider whose data was used to specify geographic locations, the map data version, release version, etc., may be included. More than one source of data may be used. In another alternative, a means may be provided to convert a location reference defined with respect to data from one data supplier to data from a different data supplier.

It is intended that the foregoing detailed description be regarded as illustrative rather than limiting and that it is understood that the following claims including all equivalents are intended to define the scope of the invention.

We claim:

1. A method of managing computer data files stored on at least one data storage device accessible by at least one computer hardware platform comprising:
    searching contents of the computer data files for a reference to a physical geographic location;
    upon finding at least one reference to a physical geographic location in the contents of one of the computer data files, associating the one computer data file with the at least one reference to the physical geographic location by adding data that specifies the physical geographic location to the one computer data file;
    providing a search function to a user that enables the user to search on the data storage device for a computer data file with added data based on the physical geographic location associated with the computer data file;

upon receiving a search request from the user, identifying the computer data files associated with the requested physical geographic location; and displaying a map that includes representations of computer data files positioned on the map around the physical geographic location requested by the user.

2. The method of claim 1 further comprising:
building an index file that associates computer data files with physical geographic locations.

3. The method of claim 2, wherein the step of building comprises:
for each of the computer data files,
accessing the computer data file from the data storage device;
searching contents of the computer data file;
identifying a reference to a physical geographic location in the contents of the computer data file; and
modifying the index to include a reference associating the computer data file with the physical geographic location.

4. The method of claim 3 wherein the index is located external to the at least one data storage device.

5. The method of claim 1 wherein the step of associating comprises:
embedding metadata in the one computer data file that specifies the physical geographic location.

6. The method of claim 5 wherein the step of embedding is performed when the one computer data file is saved on the data storage device.

7. The method of claim 1 wherein icons are used for the representations of the computer data files.

8. The method of claim 1 further comprising:
displaying a listing of computer data files associated with the physical geographic location.

9. The method of claim 1 further comprising:
browsing by physical geographic location the computer data files stored on the data storage device.

10. The method of claim 1 wherein at least some of the computer data files are associated with more than one physical geographic location.

11. The method of claim 1 wherein at least one physical geographic location to which at least one computer data file is associated is a movable location.

12. The method of claim 11 wherein the movable location corresponds to a location of a vehicle.

13. The method of claim 11 wherein the movable location corresponds to a location of a removable data storage media.

14. The method of claim 1 wherein at least some of the computer data files have different physical geographic locations associated with different specific parts of the computer data file.

15. The method of claim 14 wherein the computer data files that have different physical geographic locations associated with different specific parts of the computer data file each have an overall physical geographic location associated with the computer data file, wherein the overall physical geographic location is obtained by a weighting of the different physical geographic locations associated with the different specific parts of the computer data file.

16. The method of claim 1 further comprising:
restricting access to data files based on location.

17. The method of claim 1 further comprising:
searching contents of a group of computer data files for references to a physical location; and
upon finding a contextual relevance or similar file attributes to other files already containing known geographic locations, determining a physical location for a data file based upon the relevance or on the similar file attributes.

18. A method of managing computer data files stored on at least one data storage device accessible by at least one computer hardware platform comprising:
searching contents of the computer data files for a reference to a physical geographic location, wherein the computer data files include word processing files, emails, and web page files;
upon finding at least one reference to a physical geographic location in the contents of one of the computer data files, associating the one computer data file with the at least one reference to the physical geographic location by adding data that specifies the physical geographic location to the one computer data file; and
providing a search function to a user that enables the user to search on the data storage device for a computer data file with added data based on the physical geographic location associated with the computer data file.

19. A computer data file management system comprising:
a data storage device;
at least one computer data file stored on the data storage device;
a first application operable to search contents of the at least one computer data file for a reference to a location;
a second application operable to access the at least one computer data file and add location data to the at least one computer data file based on a search conducted by the first application; and
a search function that enables a user to search on the data storage device for a computer data file with added location data based on the location data added to the computer data file and obtain a map display showing a representation of the computer data file positioned on the map around the location searched by the user.

20. The system of claim 19 wherein the location data is added to at least one of a header, tag, and metadata of the at least one computer data file.

21. The system of claim 19 wherein the location data identifies at least one of a historical location, a fictional location, and a virtual location.

* * * * *